United States Patent [19]
Elwell

[11] Patent Number: 5,363,688
[45] Date of Patent: Nov. 15, 1994

[54] METHOD OF CALIBRATING MOTION DETECTORS WITHIN A SCALED ENVIRONMENT

[75] Inventor: Brian E. Elwell, Brentwood, Calif.

[73] Assignee: Novitas Incorporated, Calif.

[21] Appl. No.: 105,558

[22] Filed: Aug. 12, 1993

[51] Int. Cl.⁵ ............................................. G01P 13/00
[52] U.S. Cl. .................... 73/1 D; 250/221; 367/13; 367/93
[58] Field of Search ............... 73/1 D, 1 DV; 367/93, 367/94, 13; 250/221

[56] References Cited

U.S. PATENT DOCUMENTS

| | | | |
|---|---|---|---|
| 2,655,645 | 10/1953 | Bagno | 367/93 |
| 3,309,689 | 3/1967 | Keeney | 250/221 |

FOREIGN PATENT DOCUMENTS 8301855  5/1983  WIPO ..................... 250/221

*Primary Examiner*—Hezron E. Williams
*Assistant Examiner*—Daniel S. Larkin
*Attorney, Agent, or Firm*—Robbins, Berliner & Carson

[57] ABSTRACT

A scaled, isolated range test chamber is provided for testing motion sensors, such as ultrasonic occupancy detectors, in which the detector to be tested is mounted on a drawer and slid into an enclosed chamber. The enclosed chamber includes multiple motion simulators, such as rods rotated by stepper motors, which are controlled by computer to provide an accurate and repeatable scaled test environment. The ultrasonic radiation is concentrated by the scaled test environment to avoid testing anomalies resulting from time and temperature changes or human error factors. A master sensor is calibrated to detect the predetermined minor motion of the movement of a human hand in an arc through a discrete distance of one foot in one second. The motion simulators are adjusted to rotate through a larger arc at a closer distance to be detected by the master sensor in order to determine the equivalent simulated minor motion. Production sensors are then tested in the chamber using the simulated minor motion of the motion simulators.

6 Claims, 2 Drawing Sheets

METHOD OF CALIBRATING MOTION DETECTORS WITHIN A SCALED ENVIRONMENT

BACKGROUND OF THE INVENTION

1. Field of the Invention

This invention relates generally to detectors such as ultrasonic motion detectors and, in particular, to techniques for testing such ultrasonic detectors used as occupancy sensors for detecting motion in rooms.

2. Description of the Prior Art

Motion detectors, such as ultrasonic motion detectors, are used to detect the motions of people and things, moving in fixed environments, such as rooms and hallways. Such conventional detectors operate by flooding the environment to be monitored with transmitted and reflected ultrasonic energy and then detecting changes in the resultant steady state ultrasonic energy reception pattern observed by the detector from the monitored environment in order to sense changes caused by the motions of the people or things to be monitored. Conventional detectors tend to be sensitive to changes in ambient conditions, such as changes in temperature and even air densities, that interfere with their ability to accurately detect minor motions intended to be monitored. When used as occupancy detectors, for example, the detectors must be sufficiently sensitive to detect minor motions, such as the movement of a human arm through a specified arc or to reach a telephone or turn a page, without falsely being triggered by other events such as changes in the ambient conditions or motions observable through a door way or open window.

Conventional techniques for testing such detectors require the use of rooms and hallways of the same approximate size as the rooms and hallways in which such detectors are intended to be used. Such testing rooms usually must be isolated so that unintentional disturbances, such as changes in air currents or even workers walking by, don't interfere with tests in progress. These isolated testing rooms are expensive and inconvenient, particularly for use in high quality control production systems in which all of the detector units are tested in an operating environment before delivery.

In addition to the physical and other inconveniences of an isolated testing room, the testing procedures used in such rooms are difficult to accurately and repeatably replicate. To fully duplicate the testing of a particular model of sensor for each unit manufactured would, for example, require the same sized person to walk through the same room in the same way for each sensor being tested. This is impractical to achieve in a manufacturing environment.

It is common to test such sensors to verify the minimum range of motion required to trigger the sensor. A typical test might therefore require that a specified minor motion, such as a particular arm movement, be sufficient to trigger the detector while a smaller motion will not. A larger motion, such as a person walking, must always trigger the detector. To test each detector, the same minor and major motions must accurately and repeatably be applied to each device in the same environment and the detector output recorded. This has in the past been prohibitively expensive and time consuming and has lead manufacturers to test such sensors for electronic or other functional operation and only, at best, test selected units in the operating environment.

What are needed are practical, more convenient techniques suitable for the accurate and repeatable testing of such detectors in their operating environments so that all such detectors may be tested for quality control purposes.

SUMMARY OF THE INVENTION

The preceding and other shortcomings of prior art systems are addressed and overcome by the present invention that uses a scaled and isolated environment with conveniently controllable, repeatable motions, calibrated to simulate the full size environment and motions in which the detectors are to be used. In a first aspect, the present invention provides a scaled and isolated environment including a sliding drawer for positioning the sensor to be tested and motion simulators, operated by computer, to simulate scaled motions which have been determined to trigger a master or calibrated sensor in the full size working environment at the desired level of minor motion.

In another aspect, the present invention provides a range test chamber for motion detectors including a housing having an interior volume scaled with respect to the intended working environment, means for mounting the motion detector in the housing, a motion simulator positioned in the housing, the motion simulator having a size and distance from the motion detector to be tested scaled to the working environment, means for controlling the motion simulator for movement in the interior volume to simulate motions to be detected in the working environment, and means for determining activation of the detector to be tested in response to different movements of the motion simulator.

In a further aspect, the invention provides a method for testing motion detectors by mounting a motion detector in a housing having an interior volume scaled to the working environment, positioning a motion simulator in the housing, the motion simulator having a size and distance from the motion detector scaled to the working environment, controlling the motion simulator for movement in the interior volume to simulate motions to be detected in the working environment, and monitoring activation of the detector by movement of the motion simulator.

In a still further aspect, the invention provides a method for testing motion sensors by calibrating a master motion sensor in an operating environment to be monitored, positioning the master motion sensor in a scaled environment simulating the operating environment, operating motion simulators in the scaled environment to determine motion simulator testing operations which activate and do not activate the master motion sensors, replacing the master motion sensor with sensors to be tested and operating the motion simulators in accordance with the determined testing operations to test the sensors.

The foregoing and additional features and advantages of this invention will become further apparent from the detailed description and accompanying drawing figures that follow. In the figures and written description, numerals indicate the various features of the invention, like numerals referring to like features throughout for both the drawing figures and the written description.

DETAILED DESCRIPTION OF PREFERRED EMBODIMENT(S)

Figure 1:
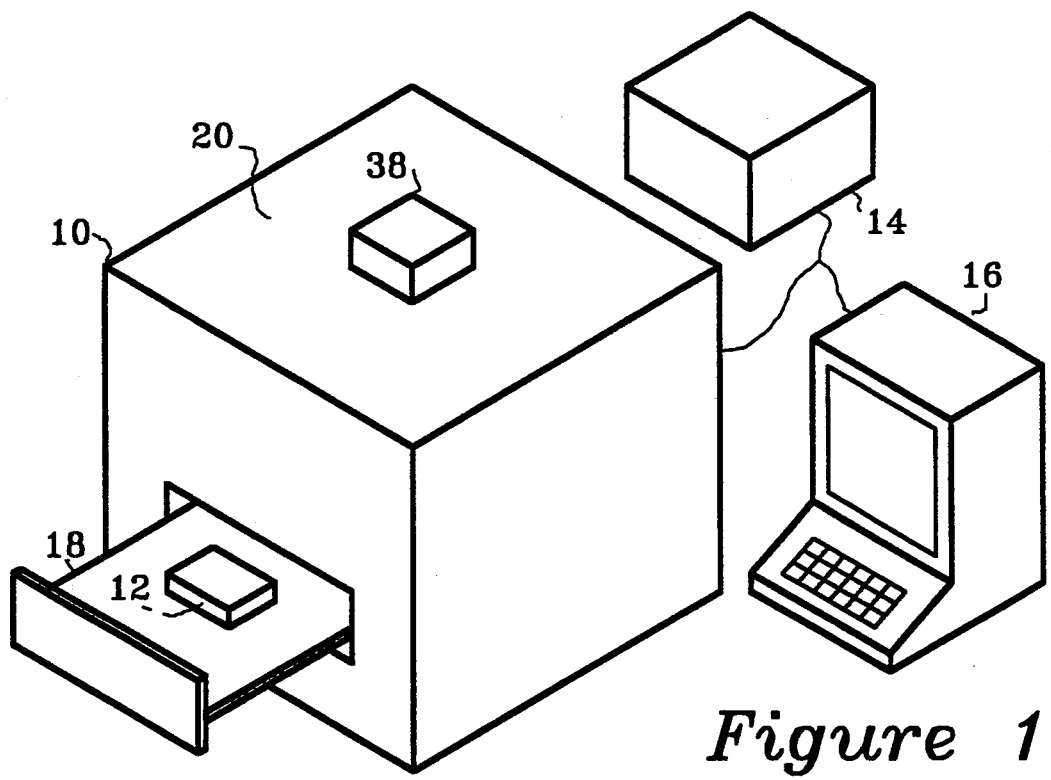
FIG. 1 is an isometric illustration of a range test chamber, detector, load and computer for controlling the test chamber, all according to the present invention.

FIG. 1 is an isometric illustration of a range test chamber 10 in which a detector 12 is mounted for testing. The detector 12 may be an ultrasonic or other motion detector or occupancy sensor for activating an alarm, or for turning on room lights or for otherwise operating a secondary device or other load, shown as a load 14, in response to the detection of a predetermined minor motion or motion greater than the minor motion. The testing procedures are controlled by a processing system, such as a computer 16, which may also record the test results.

The detector 12 is mounted on a drawer 18, shown in the extended position in FIG. 1, which provides a convenient and expedient way of mounting the detector before testing and removing the detector thereafter. Range test chamber 10 may conveniently be configured for testing different types and sizes of detectors as detector 12 by providing specially configured drawers for mounting each such type of detector. During operation of the tests, the drawer 18 is closed so that the detector 12 is positioned in the range test chamber 10 and thereby isolated from the outside ambient conditions and motions. The range test chamber 10 may be configured from any convenient material, including plywood, and may be acoustically isolated with conventional materials. The chamber may be made in any convenient size related to the environment to be simulated, and the motions to be sensed, as will be described below in greater detail.

Figure 2:
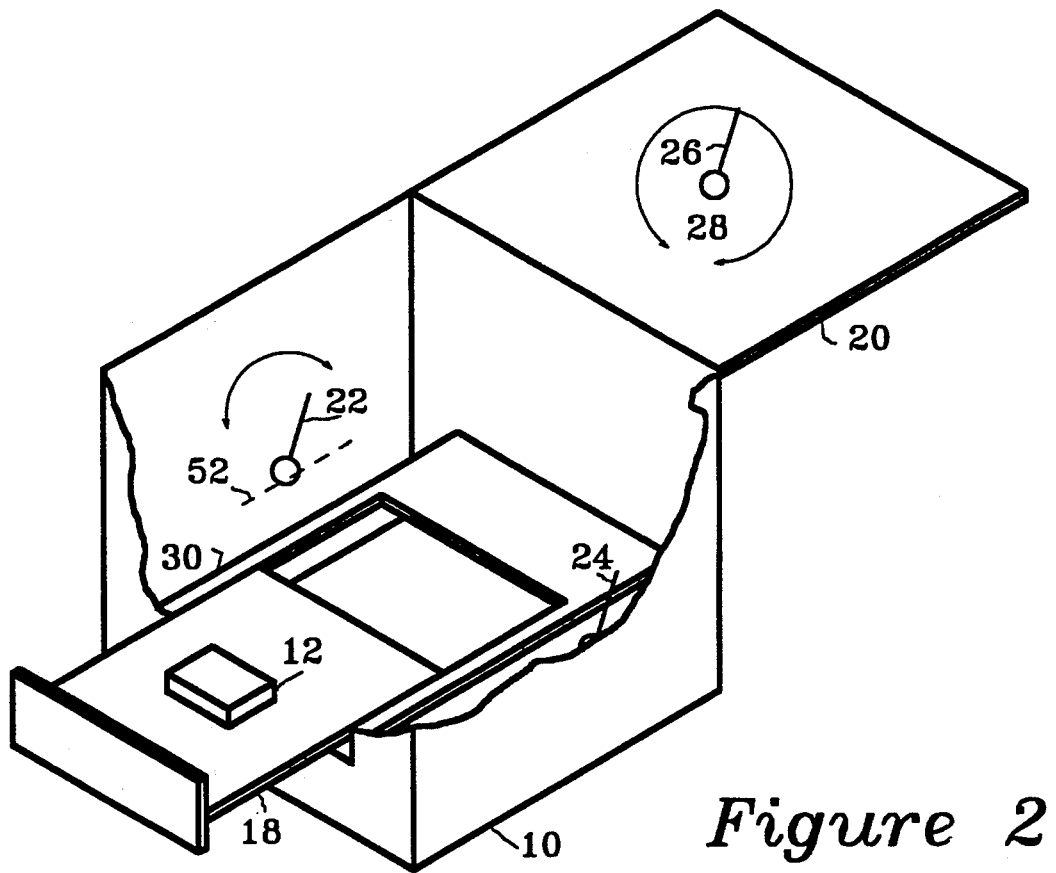
FIG. 2 is a partially cut away isometric illustration of the range test chamber shown in FIG. 1 with the top rotated open at 90° for convenience.

FIG. 2 is a partially cutaway isometric illustration of the range test chamber 10 shown in FIG. 1 with a top 20 rotated open 90° for convenience of illustration and explanation. In the preferred embodiment, the top 20 may be fixed to the rest of the range test chamber 10 rather than being rotatable as suggested in FIG. 2. The drawer 18 is illustrated in the open for convenience of illustration and would be in the closed position during actual testing. During such testing, the top 20 would also be closed as shown in FIG. 1.

In the testing position, the detector 12 is surrounded by side motion simulators 22 and 24, one on each side. Positioned directly above the detector 12, when the top 20 is in the closed position, is an overhead motion simulator 26. This configuration conveniently provides motion simulation in three dimensions. Other arrangements of motion simulators may be used for testing in particular applications. For example, in the testing of a detector utilizing a single sensor, it is convenient to mount the detector 12 to be tested so that the single sensor is positioned to face the wall opposite the opening for drawer 18. In this way, the side vision of the detector is tested by the motion simulators 22 and 24 because the sensor is effectively aimed at a point equidistant between the sensors.

Some detectors use multiple sensors to control the field of view of the detector. In the testing of a detector using a pair of sensors, it may be convenient to position the detector 12 so that each sensor of the pair is aimed directly at one or the other of the simulators 22 and 24. In this way, each such sensor is separately tested by motion of one of the simulators. If the sensors were aimed at the walls of the range test chamber 10 without motion simulators, the side vision of each sensor would be affected by simulator motion. The operation of only one of the sensors of a pair would therefore be difficult to detect in this position.

An activation detector, such as a Cadmium Sulfide (CdS) or other photosensor 28, is mounted in a convenient location with respect to the detector 12 as will be explained below in greater detail. One such convenient location for the photosensor 28 is to be positioned with the overhead motion simulator 26 on the underside of the top 20. The overhead motion simulator 26 rotates in a circle above the detector 12 while the motion simulators 22 and 24 may have a more limited range of motion, such as a 180° or slightly greater than 180° range of motion. For example, it may be convenient to mount the motion simulators 22 and 24 slightly above line 52 which is in the plane 30 of the upper surface of the drawer 18. The motion simulators 22, 24 and 26 may conveniently be simple rods or stiff wire attached to and driven by stepper motors as described below, or may have other, more representative shapes if appropriate for a particular testing application.

Figure 3:
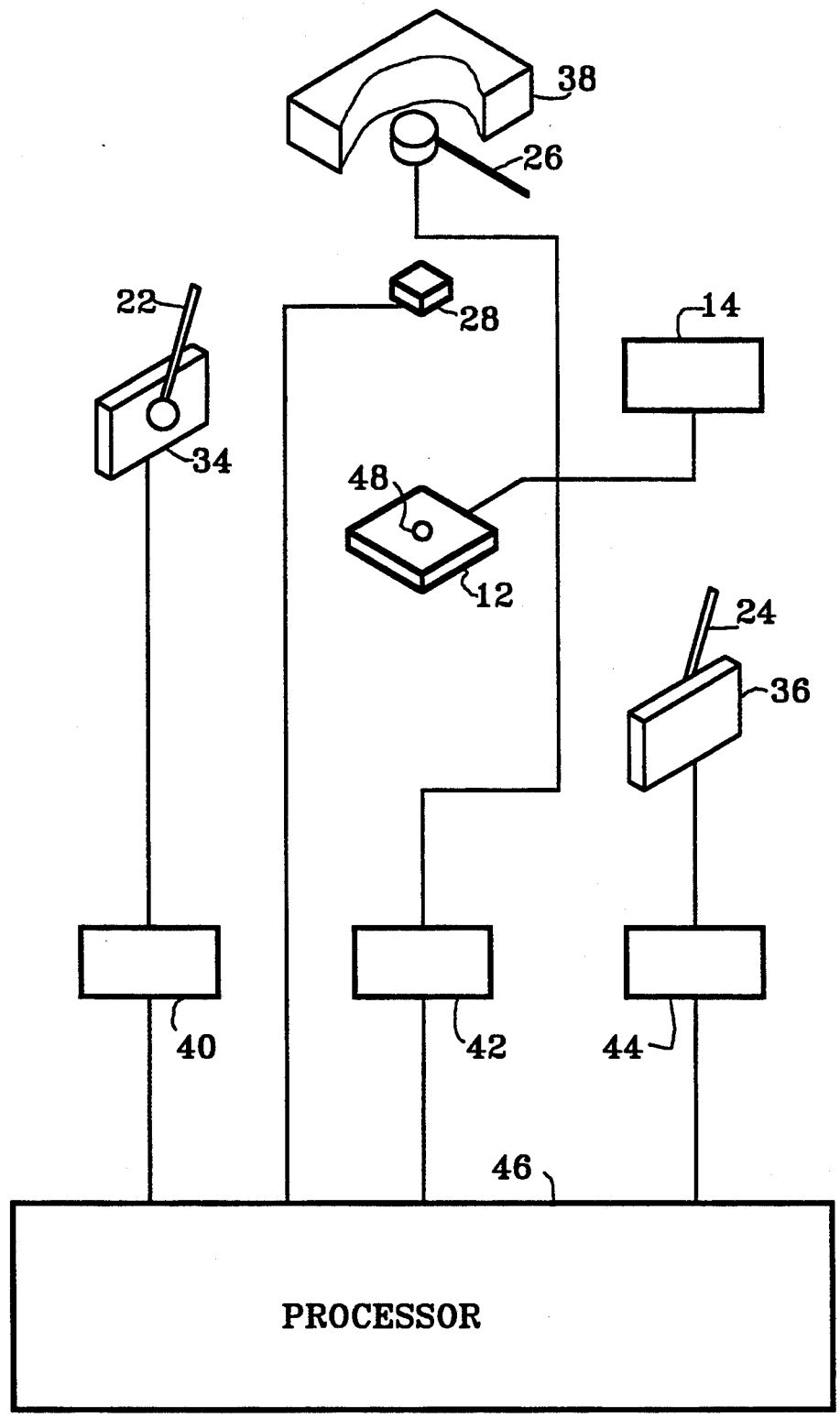
FIG. 3 is a schematic block diagram of connections between the components of the test chamber, computer and load shown in FIG. 1 and FIG. 2.

FIG. 3 is a schematic block diagram of connections between the components of the test chamber, computer and load shown in FIG. 1 and FIG. 2. As may be easily seen in FIG. 3, the detector 12 is surrounded, in three dimensions, by the motion simulators 22, 24 and 26 which are controlled by side stepper motors 34 and 36 and by an overhead stepper motor 38, respectively. The overhead stepper motor 38 is shown in partial cutaway view in FIG. 3 to better illustrate the overhead motion simulator 26 and is mounted on the opposite side of the top 20 therefrom as is shown in FIG. 1. One convenient type of stepper motor and driver combination that may be used is the Super VEXTA UMD motor driver package available from Oriental Motor U.S.A. Corporation of Torrance, Calif. VEXTA is a registered trademark of Oriental Motor U.S.A. Corporation.

The stepper motors 34 and 36 may be mounted wherever convenient such as in or on the sides of the range test chamber 10. In particular, the stepper motors 34 and 36 may be positioned at or slightly above line 52 in the plane 30 of the upper surface of the drawer 18. In this way, the effect of the operation of the stepper motors 34 and 36 on the activation of the detector 12 may be eliminated or minimized while providing a 180° or slightly greater than 180° range of motion of the motion simulators 22 and 24 in the field of view of the detector 12.

The stepper motors 34, 36 and 38 are each driven by stepper motor drivers 40, 42 and 44, respectively, under control of a test control processor 46 which may be part of the computer 16 shown in FIG. 1. Processor 46 receives the output of the photosensor 28 as an additional input. The output of the photosensor 28 may conveniently be a latched output maintained for a specified duration or until reset by computer 16 so that the detection of the activation of LED 48 is maintained by latching to insure that this activation is indicated by the photosensor 28 when interrogated by computer 16. That is, if computer 16 is busy performing other functions, such as causing the programmed motion of a motion simulator, when the activation of LED 48 is detected by the photosensor 28, the indication of this detection is maintained by the latching function associated with photosensor 28 so that this indication is available to computer 16 when that computer is no longer busy. The detector 12 is connected to the load 14 if required by the nature of the detector being tested.

In operation, the drawer 18 of the range test chamber 10 is opened and the detector to be tested is positioned as shown as the detector 12. If convenient for efficient testing, a first detector 12 may be in the range test chamber 10 being tested while a second detector is being mounted on an additional drawer 18. When the testing of the first detector is completed, the entire drawer and detector assembly may be replaced so that the lost time between test operations may be minimized. Similarly, different versions of drawer 18 may be configured specially for different versions of the detector 12 to be tested to minimize the time required for set up of the range test chamber 10 for different types of detectors to be tested.

Once the detector 12 to be tested has been mounted on the drawer 18 and inserted within the range test chamber 10, a preprogrammed sequence of motions selected to test the detector 12 is begun. The test control processor 46 applies the appropriate signals to the stepper motor drivers 40, 42 and 44 to operate the stepper motors 34, 36 and 38 to move the motion simulators 22, 24 and 26 in a series of predetermined patterns. For example, the test sequence may begin by positioning all motion simulators 22, 24 and 26 so that they point in a predetermined direction, such as pointing toward the wall of the range test chamber 10 through which drawer 18 is inserted.

Then motion simulator 22 may be rotated at a predetermined speed through a predetermined arc towards the opposite wall of the range test chamber 10. For convenience, this direction of rotation will be referred to as the forward direction. The predetermined arc may be 180° or slightly more than 180°. In certain applications for the testing of particular types of detectors, it may be convenient to test the detector 12 only for motion of the simulators in an arc less than 180° such as from 45° to 135°. The motion of the simulator through the portion of the arc not to be tested, such as from 0° to 90° in the above example, may occur before the test sequence or the photosensor 28 may be reset after the motion simulator has been moved to the beginning of the arc to be detected.

Thereafter, the motion simulator 22 may be returned through the same arc in the reverse direction. Motion simulator 24 may then conveniently be operated in a similar manner, first in one direction and then in the reverse direction. Thereafter, overhead motion simulator 26 may be rotated in a first direction and then in a reverse direction. Since the entire rotation of overhead motion simulator 26 is in the field of view of the detector 12, it may be convenient for example, to rotate overhead motion simulator 26 in a full circle in the clockwise direction and then in a full circle in the counterclockwise direction.

A conventional detector 12 may indicate the detection of motion by illuminating a light emitting diode, represented by the LED 48. The output of the LED 48 is detected by a photosensor 28, indicating to the test control processor 46 that the detector 12 has been activated. As an alternative, in lieu of or in addition to the sensor 28, certain types of motion detectors to be tested operate loads such as the load 14. Activation of the load may be sensed to provide information that the detector has been triggered. Such motion detectors may require the presence of the load 14 for actual activation and operation in order to properly test the detector 12. In the case of an occupancy sensor, for example, the detector 12 may conveniently be a wall switch incorporating a sensor and the load 14 would be a room light.

The range test chamber 10 provides a substantial advantage over conventional motion sensor test beds because the motions and sizes of the motion simulators 22, 24 and 26 may be scaled to the size of the interior of the range test chamber 10 to effectively simulate the intended working environment of the detectors to be tested at much lower cost and with greater accuracy and repeatability. In particular, the effects of human error factors may be avoided by use of computer control. For example, a relatively small motion of the motion simulator 22 at a relatively short distance from the detector 12 may be used to repeatably simulate a much larger motion of a larger object at a greater distance. The stepper motors 34, 36 and 38 may provide, for example, for 400 steps for full rotation so that the number of steps and the time duration of the stepping of the motion simulators may conveniently be controlled to within the accuracy of the stepper motors used.

The calibration of the range test chamber 10 may conveniently be accomplished as follows. During or after product design and development, a new type of detector to be produced may be first tested in a full size working environment, not shown, such as a combined room and hallway. A particular detector deemed to operate properly within its designed range for detection may be considered to be the master or exemplar detector and would be adjusted so that, in the full size working environment described above, the detector will not be triggered by motions too small to be detected, and will be triggered only by the so-called minor motions just large enough to be desirably detected. For example, the master detector might be adjusted so that it was not triggered by events not intended to be detected but was triggered by the smallest motion or event intended to be triggered.

Events not intended to be triggered includes even substantial changes in the ambient conditions in the room such as changes in the heating or cooling of the room. In many applications, such as a room occupancy sensor, movements in an adjacent hallway and/or by an open door of the room may not be intended to be detected. However, movements within the room to be monitored, even the so-called minor motion of moving an arm while seated at a desk, may be desired to be detected. The sensitivity of the exemplar detector would therefore be adjusted to detect minor motion in the room but not detect motion in an adjacent hallway.

Once the exemplar detector has been tested and adjusted in a full size environment, the exemplar detector may then placed used to calibrate the range test chamber 10 so that the range and speed of motion of motion simulators 22, 24 and 26 required to trigger the exemplar detector may be determined. As noted above, the exemplar detector has previously been adjusted so that its threshold of sensitivity is high enough to almost but not quite detect unwanted events and therefore sufficiently sensitive to detect desired events in the full size room. Therefore, when used in the simulated environment of the range test chamber 10, the appropriate range and speed of motion of the motion simulators to just barely trigger the detector may be determined. The approximate magnitudes and type of motion required to just trigger the detectors may easily be estimated by scaling or other means, but the use of the exemplar detector to test the accuracy of the simulation in the range test chamber 10 is an important advantage of the present invention.

For example, if the minor motion of a human arm rotating through a 90° arc is intended to trigger the detector in the full size room, but a slower or smaller motion of arm is not intended to trigger the detector, the exemplar detector would be adjusted to respond to the desired minor motion, but not to smaller motions. When placed in the range test chamber 10 to calibrate the chamber, the speed and number of steps of motion of the motion simulator which just barely triggers the detector may easily be determined in order to calibrate the range test chamber 10. Thereafter, when a production detector is being tested in the room, it is well within the skill of a person of ordinary skill in this art to program computer 16 to operate a motion simulator through a first particular range of motion at a first particular speed to test that the minor motion simulated thereby will be sufficient to trigger the detector.

If desired, a second range of motion at a second particular speed may be used to verify that simulated motions less than the simulated desired minor motion do not trigger the detector. Most such detectors have sensitivity adjustments so that, if the sensitivity adjustment is set at mid range before testing and the simulated minor motion does in fact trigger the detector, it may not be necessary to test that the smaller motion does not trigger the detector.

During an actual test sequence, the range test chamber 10 is mounted on the drawer 18 and the drawer is closed to position the detector in the isolated environment of the range test chamber 10. The computer 16 would then cause test control processor 46 to move the motion simulators 22, 24 and 26 in accordance with a predetermined test sequence while monitoring the status of the LED 48 with the photosensor 28. The predetermined test sequence may include small steps that may be repeated at different angular positions to determine the minimum motion by the motion simulators 22, 24 and 26 required to trigger the detector 12 in order to correlate this minimum triggering motion with the minimum triggering motion required in a full size room.

One particularly convenient minor motion test contemplated by the present invention is related to the discreet motion of a human arm in an arc about the elbow. In particular, the discreet movement of an average human arm through a distance of one foot in one second by rotation of the arm about the elbow has proven to be an exceptionally useful test for minor motion.

Assuming that an average human arm bent at the elbow with the hand open and extended is about 14 inches from elbow to finger tip, the radius of the minor motion test as described above is therefore about 14 inches. The minor motion to be detected is therefore the discreet motion of the arm that causes the finger tip to move a total distance of one foot in one second.

In a preferred embodiment of the present invention, this motion is repeated at the appropriate distance from a master sensor which is adjusted until this minor actual motion of one foot in one second is repeatably detected by a two way sensor with an approximate detection radius of about 30 feet. Thereafter, the chamber is calibrated so that a simulated motion in the chamber is also repeatably detected by the same sensor. In a particular embodiment, a ⅛ inch diameter rod extending six inches from its axis of rotation which travels 180° in a period of 21.4 seconds will trigger the same detector at a detection radius of about 1.5 feet. Different sensor designs will of course require different chamber calibrations.

Once the range test chamber 10 is calibrated by an exemplar detector which operates as desired in a full size environment, it is easy and efficient to perform the same tests on a production run of detectors by putting each such detector in the range test chamber 10 and causing the motion simulators 22, 24 and 26 to move in the same manner. A substantial advantage of this approach is that the radiation flooding the test environment, such as ultrasonic radiation, is concentrated by the smaller, scaled simulated environment in the range test chamber 10 in order to avoid the otherwise troublesome testing anomalies resulting over time from temperature changes and other environmental changes.

One substantial advantage of the controlled, scaled sized test environment provided by the range test chamber 10, is that the smaller size of the interior of the range test chamber 10, when compared to a full size room, reduces testing inconsistencies due to air currents, changes in temperature and density by concentrating the ultrasonic or other radiation emitted by the detector 12 so that it does not vary unintentionally as it may do in a larger test environment. In addition, the range test chamber 10 may conveniently be acoustically shielded from outside influences with acoustic insulation. Further, the accuracy and repeatability of such tests performed by a computer controlled system which avoids human error factors is a substantial improvement over conventional test approaches.

The present invention operates to test one way motion detectors and wall switches as well as the two way type of motion detector described above in the preferred embodiment. While this invention has been described with reference to its presently preferred embodiment(s), its scope is not limited thereto. Rather, such scope is only limited insofar as defined by the following set of claims and all equivalents thereof.

What is claimed is:

1. A method for testing motion sensors, comprising:
   calibrating a master motion sensor in an operating environment to be monitored;
   positioning the master motion sensor in a scaled environment simulating the operating environment;
   operating motion simulators in the scaled environment to determine motion simulator testing operations which activate and which do not activate the master motion sensors;
   replacing the master motion sensor with sensors to be tested; and
   operating the motion simulators in accordance with the determined testing operations to test said sensors.

2. The invention of claim 1, wherein the step of calibrating the master motion sensor in an operating environment to be monitored further comprises the step of:
   adjusting the master motion sensor to reliably detect a predetermined minor motion.

3. The invention of claim 2, wherein the step of adjusting the master motion sensor to reliably detect a predetermined minor motion comprises the step of:
   adjusting the master sensor to reliably detect the motion of an object approximating a human arm rotating about an elbow in a first arc through a distance of one foot in a time period of one second.

4. The invention of claim 3, wherein the step of adjusting the master sensor includes the step of:
   positioning the master sensor at a predetermined first distance from the object.

5. The invention of claim 4, wherein the step of operating the motion simulators in accordance with the determined testing operations to test said sensors includes the step of:
   positioning the master sensor at a second distance from the motion simulators, said second distance being less than said first distance.

6. The invention of claim 5, wherein the step of operating the motion simulators to test the sensors includes the step of:
   rotating the motion simulators through a second arc, said second arc being smaller than said first arc.

* * * * *